US006999756B2

(12) United States Patent
Cho

(10) Patent No.: US 6,999,756 B2
(45) Date of Patent: Feb. 14, 2006

(54) APPARATUS FOR PROCESSING CALL OF WIRELESS LAN USING CALLBACK FUNCTION AND METHOD THEREOF

(75) Inventor: Seong-Kwan Cho, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 211 days.

(21) Appl. No.: 10/721,346

(22) Filed: Nov. 26, 2003

(65) Prior Publication Data

US 2004/0106394 A1 Jun. 3, 2004

(30) Foreign Application Priority Data

Dec. 2, 2002 (KR) ...................... 10-2002-0076048

(51) Int. Cl.
*H04M 3/42* (2006.01)
(52) U.S. Cl. .............................. 455/414.1; 370/210.01; 370/209.01; 370/207.04; 370/207.05; 370/207.6; 370/207.07
(58) Field of Classification Search ........ 455/414–418; 370/209.01, 210.01, 207.4–207.7
See application file for complete search history.

(56) References Cited

U.S. PATENT DOCUMENTS

| 6,032,040 | A | 2/2000 | Choy et al. |
|---|---|---|---|
| 6,169,795 | B1 | 1/2001 | Dunn et al. |
| 6,259,891 | B1 | 7/2001 | Allen |
| 6,629,151 | B1 | 9/2003 | Bahl |
| 2002/0098840 | A1 | 7/2002 | Hanson et al. |
| 2002/0145980 | A1 | 10/2002 | Morley et al. |
| 2003/0081752 | A1 * | 5/2003 | Trandal et al. ......... 379/210.01 |
| 2003/0206619 | A1 * | 11/2003 | Curbow et al. ........ 379/210.01 |

FOREIGN PATENT DOCUMENTS

WO WO 02/51191 A1 6/2002

OTHER PUBLICATIONS

*Search and Examination Report under Sections 17 & 18(3)* from the British Patent Office issued in Applicant's corresponding British Patent Application No. GB0327566.6 (dated Apr. 20, 2004).

* cited by examiner

*Primary Examiner*—Lester G. Kincaid
*Assistant Examiner*—Dung Lam
(74) *Attorney, Agent, or Firm*—Robert E. Bushnell, Esq.

(57) ABSTRACT

An apparatus for processing a call of a wireless LAN using a callback function and a method thereof are for connecting calls when target terminals (destination terminals) are converted into a keep-alive state from a keep-dead state (for example, out of an access point section or power is turned off) by periodically receiving state information of other terminals in a transmitting terminal. A structure is as follows: a terminal 1 or a terminal n periodically transmits a keep-alive signal to a wireless LAN exchange; the wireless LAN exchange considers a terminal from which the keep-alive signal is not transmitted as a keep-dead terminal, and transmits an the telephone number list of the keep-dead terminals to each terminal; after information between the terminals and the wireless LAN exchange is periodically transceived, when users substantially attempt calls to target terminals, a callback service is requested if telephone numbers of the target terminals are stored in the telephone number list, and the calls are automatically attempted to the target terminals from the terminal in case the target terminals are converted into a keep-alive state from a keep-dead state.

20 Claims, 7 Drawing Sheets

APPARATUS FOR PROCESSING CALL OF WIRELESS LAN USING CALLBACK FUNCTION AND METHOD THEREOF

CLAIM OF PRIORITY

This application makes reference to, incorporates the same herein, and claims all benefits accruing under 35 U.S.C. §119 from an application for APPARATUS FOR PROCESSING CALL OF WIRELESS LAN USING CALLBACK FUNCTION AND METHOD THEREOF earlier filed in the Korean Intellectual Property Office on 2 Dec. 2002 and there duly assigned Serial No. 2002-76048.

BACKGROUND OF THE INVENTION

1. Field of the Invention

The present invention generally relates to an apparatus for processing a call of a wireless LAN using a callback function and a method thereof for processing the call between terminals operated on the basis of the wireless LAN, and more specifically to an apparatus for processing a call of a wireless LAN using a callback function and a method thereof for connecting the call when target terminals are converted into a keep-alive state from a keep-dead state (for example, out of an access point (AP) section or power is turned off) by periodically receiving state information of other terminals in a transmitting terminal.

2. Description of the Related Art

Recently, as a wireless office telephone service using Wireless Office Solution (WOS) has been regularized, Private Branch exchange (PBX) performing a simple in-house exchange function in the past has almost disappeared. The wireless office telephone service securing mobility as receiving all advantages of an Internet Protocol (IP)-based IP PBX has become influential rapidly in the domestic market along with marketing strategies of mobile communication providers.

In another words, a Public Switched Telephone Network (PSTN)-based PBX is changed to an IP-based PBX and combined with Code Division Multiple Access (CDMA) technologies, thus enterprises have concretely accomplished cable and wireless integration in themselves.

Hereinafter, a configuration of a system performing a wireless office telephone service will be more fully described in reference to the accompanying drawings.

FIG. 1 is a format diagram conceptually illustrating an available access range section between a wireless LAN exchange and terminals.

As shown in FIG. 1, a wireless office telephone service is performed by installing an AP 20, a wireless LAN (local area network) base station, in an IP-based PBX, which is a wireless LAN exchange 10.

However, in the above configuration, if terminals (T1~Tn) are out of an available range of the AP 20, that is, they are located in the same position as a terminal (Ts), it becomes inaccessible. Thus, though the terminals are not busy, there is no way to connect calls.

In addition, since wireless LAN terminals moving much have a lot of battery consumption capacities, it is easy to use up all power. Therefore, though the terminals are not busy, it is impossible to connect calls owing to power-off states of the terminals.

Accordingly, when target terminals (destination terminals or receiving terminals) re-enter the available range after going out of the available range of the AP 20 or power is turned on by changing a battery from a keep-dead state due to a power-off state, a service for automatically connecting calls to the target terminals themselves is requested.

SUMMARY OF THE INVENTION

It is therefore an object of the present invention to provide an apparatus for processing a call of a wireless LAN using a callback function and a method thereof for automatically attempting calls to target terminals converted into a keep-alive state from a keep-dead state by each terminal, when the terminals periodically transmit information on the keep-alive state to a wireless LAN exchange and the wireless LAN exchange transmits a telephone number list about keep-dead terminals to the terminals by considering terminals from which a keep-alive signal is not transmitted as the keep-dead terminals.

It is another object to provide an apparatus and method for processing a call of a wireless LAN using a callback function that is efficient and easy to implement.

It is yet another object to provide an apparatus and method for processing a call of a wireless LAN using a callback function that reduces time wasted by unnecessary manual operations.

To accomplish the above and other objects, a method of processing a call of a wireless LAN using a callback function in accordance with the present invention, includes: periodically transmitting a keep-alive signal to a wireless LAN exchange from terminals; considering terminals from which the keep-alive signal is not transmitted as keep-dead terminals, and transmitting an off list about the keep-dead terminals to each terminal by the wireless LAN exchange; attempting calls to target terminals (destination terminals or receiving terminals) to be substantially called from the terminals, and requesting a callback service according to user intentions if telephone numbers of the target terminals are stored in the telephone number list; and automatically attempting the calls to the target terminals from the terminals when the target terminals are converted into a keep-alive state from a keep-dead state, if the callback service is requested.

In addition, to accomplish the above and other objects, in an apparatus for processing a call of a wireless LAN, the apparatus for processing the call of the wireless LAN using a callback function in accordance with the present invention, includes: a terminal composed of a user interface interfacing with a user in order to perform a corresponding command according to a selected operation of the user, a call controller overall controlling calls, a network interface interfacing to physically perform communication between the terminal and a wireless LAN exchange, and a system interface having data on an telephone number list storing a list of keep-dead target terminals as Is interfacing with a wireless LAN exchange system and having data on a call list storing a call request scheduled list corresponding to telephone numbers to which users request a callback service among telephone numbers of target terminals that fail to attempt calls; and the wireless LAN exchange composed of a call controller overall controlling calls, a terminal interface considering terminals from which a keep-alive signal is not transmitted as keep-dead terminals as interfacing with the terminals and storing a telephone number list of the keep-dead terminals in a terminal state information storage, a network interface interfacing to physically perform communication between the terminal and the wireless LAN exchange, and an AP connected to the network interface in a wire line to enable wireless communication between the wireless LAN exchange and the terminal and transceiving a wireless signal to the terminal.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art.

The present invention will now be described more fully hereinafter with reference to the accompanying drawings, in which preferred embodiments of the invention are shown, so that this disclosure will be thorough and complete, and will fully convey the scope of the invention to those skilled in the art.

'Target terminals' described in the present invention mean destination terminals (receiving terminals) to which users want to make calls.

Figure 2:
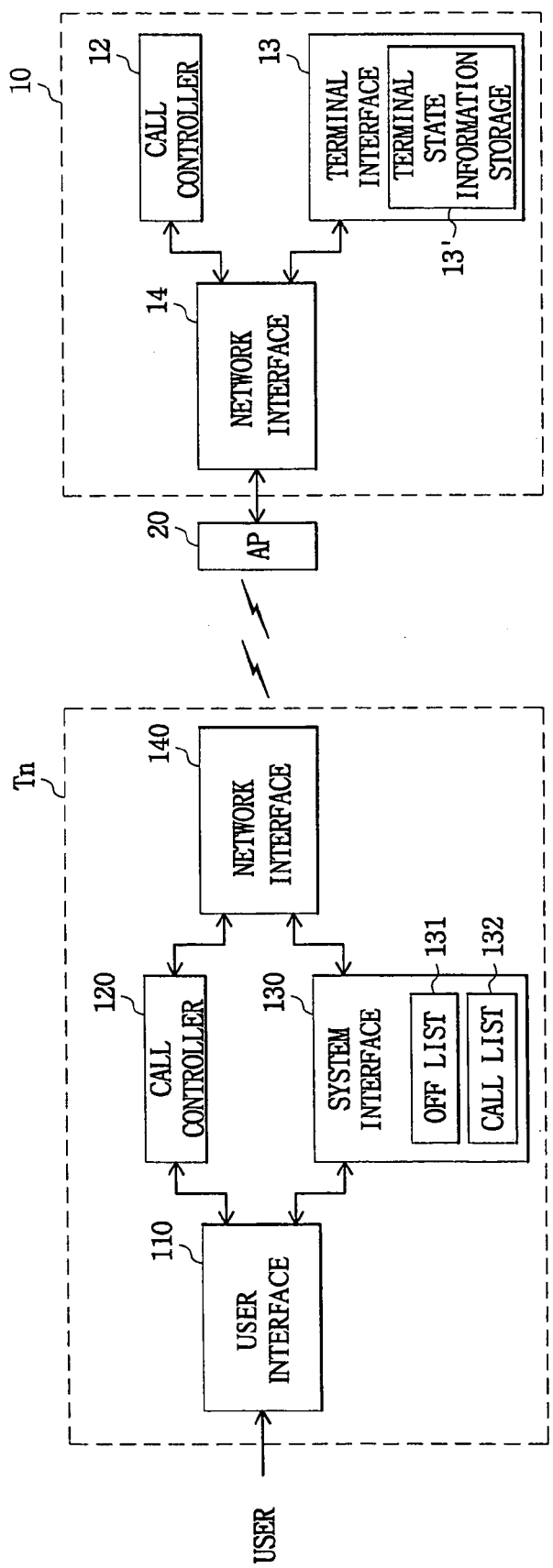
FIG. 2 is a block diagram illustrating main parts of a wireless LAN exchange and a terminal in accordance with one embodiment of the present invention.

FIG. 2 is a block diagram illustrating main parts of a wireless LAN exchange and a terminal in accordance with one embodiment of the present invention.

First, as shown in FIG. 2, the wireless LAN exchange and a terminal system in accordance with one embodiment of the present invention includes: a terminal (Tn) composed of a user interface 110, a call controller 120, a network interface 140, and a system interface 130; and a wireless LAN exchange 10 composed of a call controller 12, a terminal interface 13, a network interface 14, and an AP (Access Point) 20.

The user interface 110 of the terminal (Tn) interfaces with a user to perform a corresponding command according to a selected operation of a user, and the call controller 120 controls the calls overall. The network interface 140 interfaces to physically perform communication between terminals (T1~Tn) and the exchange 10.

The system interface 130 interfaces with the wireless LAN exchange 10, and has data on an off list 131 storing a list of all keep-dead terminals and data on a call list 132 storing a call request scheduled list corresponding to telephone numbers to which a call back service is requested by a user among telephone numbers of target terminals that fail to attempt calls.

The call controller 12 of the wireless LAN exchange 10 overall controls calls, and the network interface (14) interfaces to physically perform communication between the terminals (T1~Tn) and the exchange (10). The AP (20) is connected to the network interface (14) in a wire line to enable wireless communication between the wireless LAN exchange (10) and the terminals (T1~Tn), and transceives a wireless signal to the terminals (T1~Tn).

The terminal interface (13) interfaces with the terminals (T1~Tn), and considers terminals to which a keep-alive signal is not transmitted as keep-dead terminals. An off list about the keep-dead terminals is stored in a terminal state information storage 13'.

Generally, a callback function is supplied to an existing cable telephone system. With this function, when a respondent or the other party is busy on the line, a call is automatically connected later by leaving a contact telephone number. Also, this function is supplied from a cell center or a PBX.

However, the callback function in the present invention is transformed to automatically attempt calls from terminals, when target terminals are converted into a keep-alive state from a keep-dead state.

Hereinafter, a basic concept of a callback service by the present invention will be described as follows.

Figure 3:
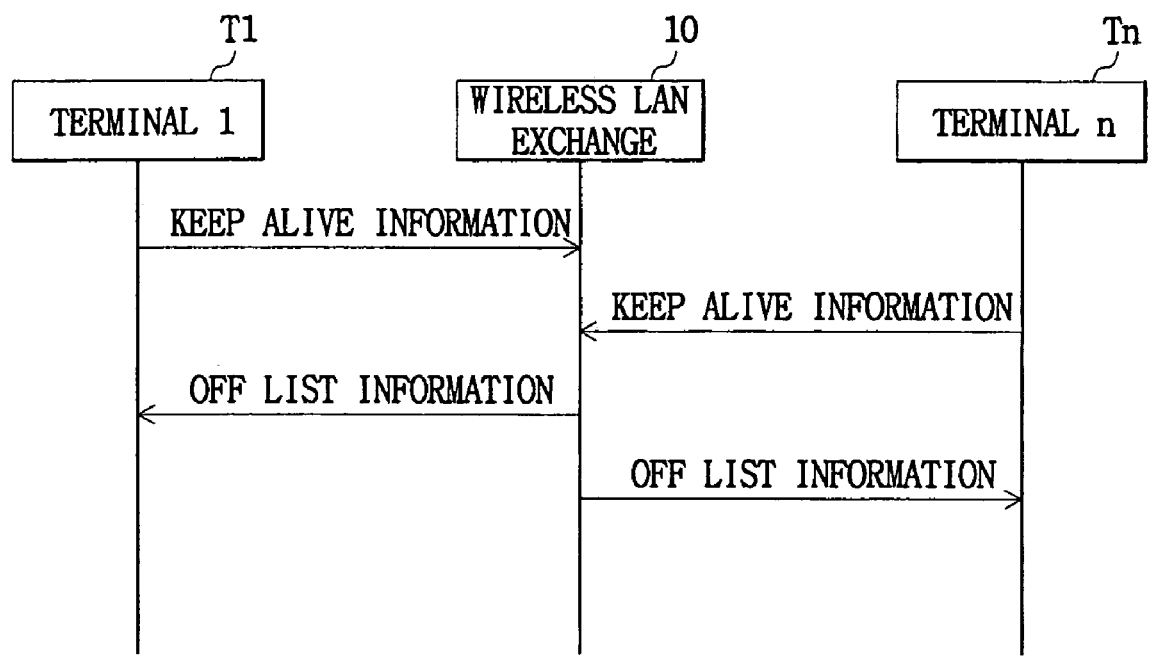
FIG. 3 is a conceptual diagram illustrating a procedure of transceiving terminal state information between a wireless LAN exchange and many terminals to apply a callback function by the present invention.

FIG. 3 is a conceptual diagram illustrating a procedure of transceiving terminal state information between a wireless LAN exchange and many terminals to apply a callback function by the present invention.

As shown in FIG. 3, when a terminal (T1) or a terminal n (Tn) periodically transmits a keep-alive signal to a wireless LAN exchange 10, the wireless LAN exchange 10 stores state information of a responding terminal in a terminal state information storage 13', and upgrades off list information on terminals that do not respond to the signal based on the stored information.

Figure 1:
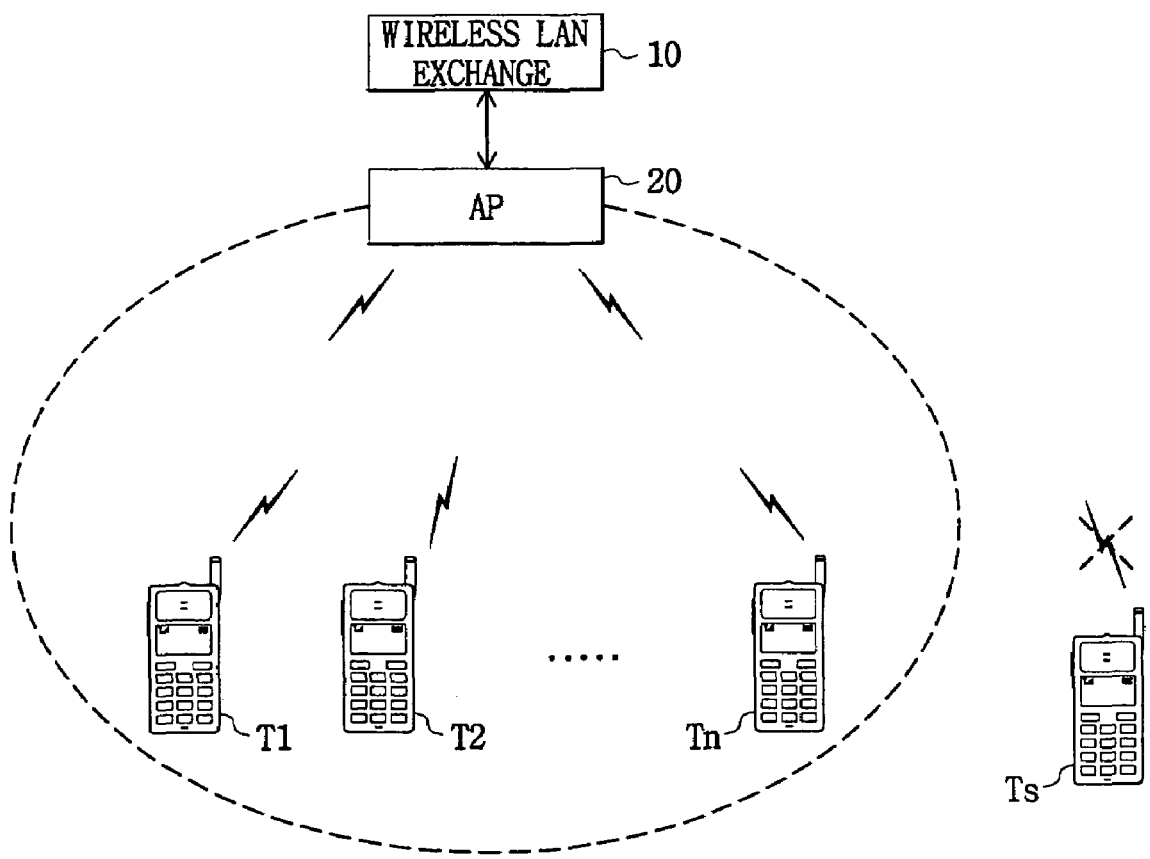
FIG. 1 is a format diagram conceptually illustrating an available access range section between a wireless LAN exchange and terminals.

At this time, as shown in FIG. 1, a keep-alive signal is transmitted to a wireless LAN exchange 10 through an AP 10 unless terminals (T1~Tn) within an available section of the AP are powered-off or busy.

On the contrary, since a terminal (Ts) out of the available section of the AP does not receive the keep-alive signal in the AP (20), though the signal is transmitted, the wireless LAN exchange (10) processes the terminal (Ts) as a keep-dead state.

Thus, the wireless LAN exchange (10) considers the terminal (Ts) to which the keep-alive signal is not transmitted as a keep-dead terminal, and transmits an off list of the keep-dead terminal to all the terminals (T1~Ts).

After terminal information is periodically transceived between the terminals (T1~Tn) and the wireless LAN exchange (10), when users attempt to make calls to target terminals to be substantially called, the calls cannot be made at present if telephone numbers of the target terminals are stored in an off list 131. Thus, a callback service is requested or the calls are given up according to a user's intention.

If the users request the callback service, the terminals automatically attempt to make calls to the target terminals when the target terminals are converted into a keep-alive state from a keep-dead state.

Figure 4:
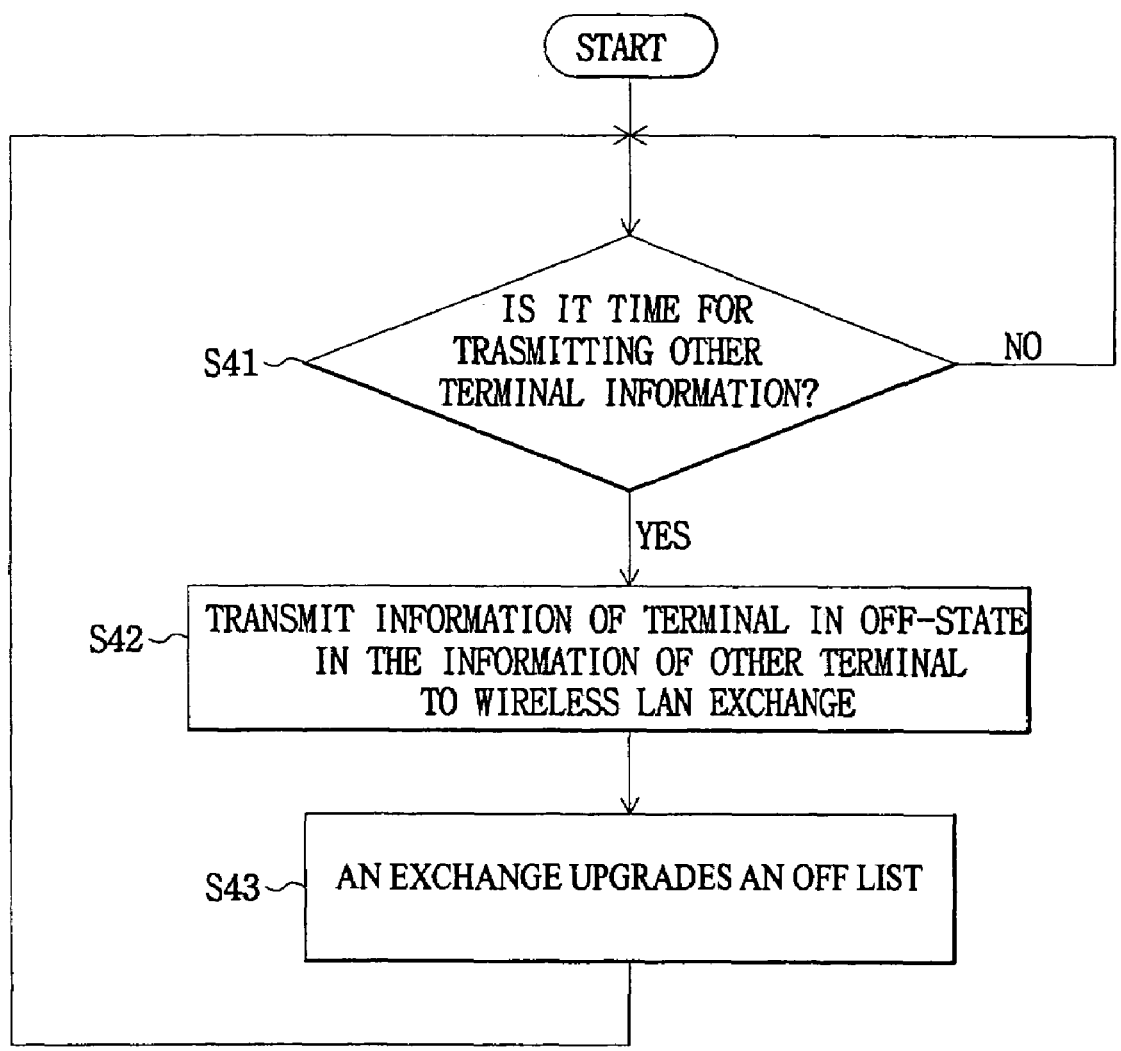
FIG. 4 is a flow chart illustrating a process of transmitting terminal state information to an exchange from a terminal according to one embodiment of the present invention.

FIG. 4 is a flow chart illustrating a process of transmitting terminal state information to an exchange from a terminal according to one embodiment of the present invention.

Hereinafter, among the above conceptual operation relations, a process of transmitting terminal state information to an exchange from terminals will be described in reference to FIG. 4.

First, when a keep-alive transmission period has come (S41), each terminal transmits a keep-alive signal to a wireless LAN exchange (10), so that the wireless LAN exchange 10 knows state information of each terminal (S42).

The wireless LAN exchange 10 stores telephone numbers about terminals (T1~Tn) to which the keep-alive signal is transmitted and a terminal (Ts) to which the signal is not transmitted in a terminal state information storage (13'), and upgrades contents of the terminal state information storage (13') every keep-alive transmission period (S43).

Figure 5:
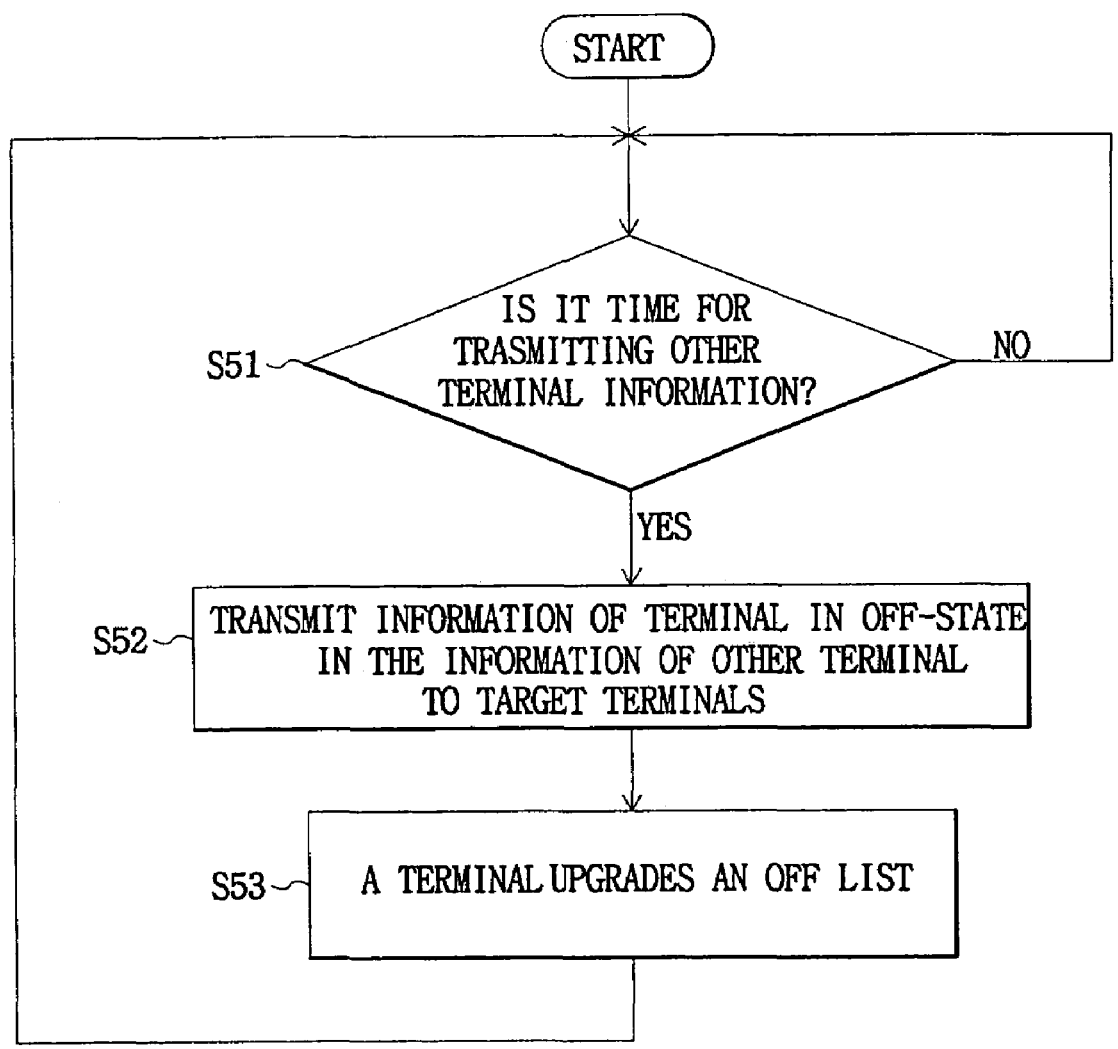
FIG. 5 is a flow chart illustrating a process of transmitting state information of other terminals to target terminals from an exchange according to one embodiment of the present invention.

FIG. 5 is a flow chart illustrating a process of transmitting state information of other terminals to target terminals from an exchange according to one embodiment of the present invention.

Hereinafter, among the conceptual operation relations, a process of transmitting an off list to terminals from an exchange will be described in reference to FIG. 5.

When other terminal information transmission period has come S51, a wireless LAN exchange 10 considers terminals to which a keep-alive signal is not transmitted as keep-dead terminals based on contents stored in a terminal state information storage 13', and transmits an off list about the keep-dead terminals to all terminals S52.

Each terminal receives the off list from the wireless LAN exchange 10 by the step 'S52', and upgrades contents of the off list 131, S53.

Figure 6:
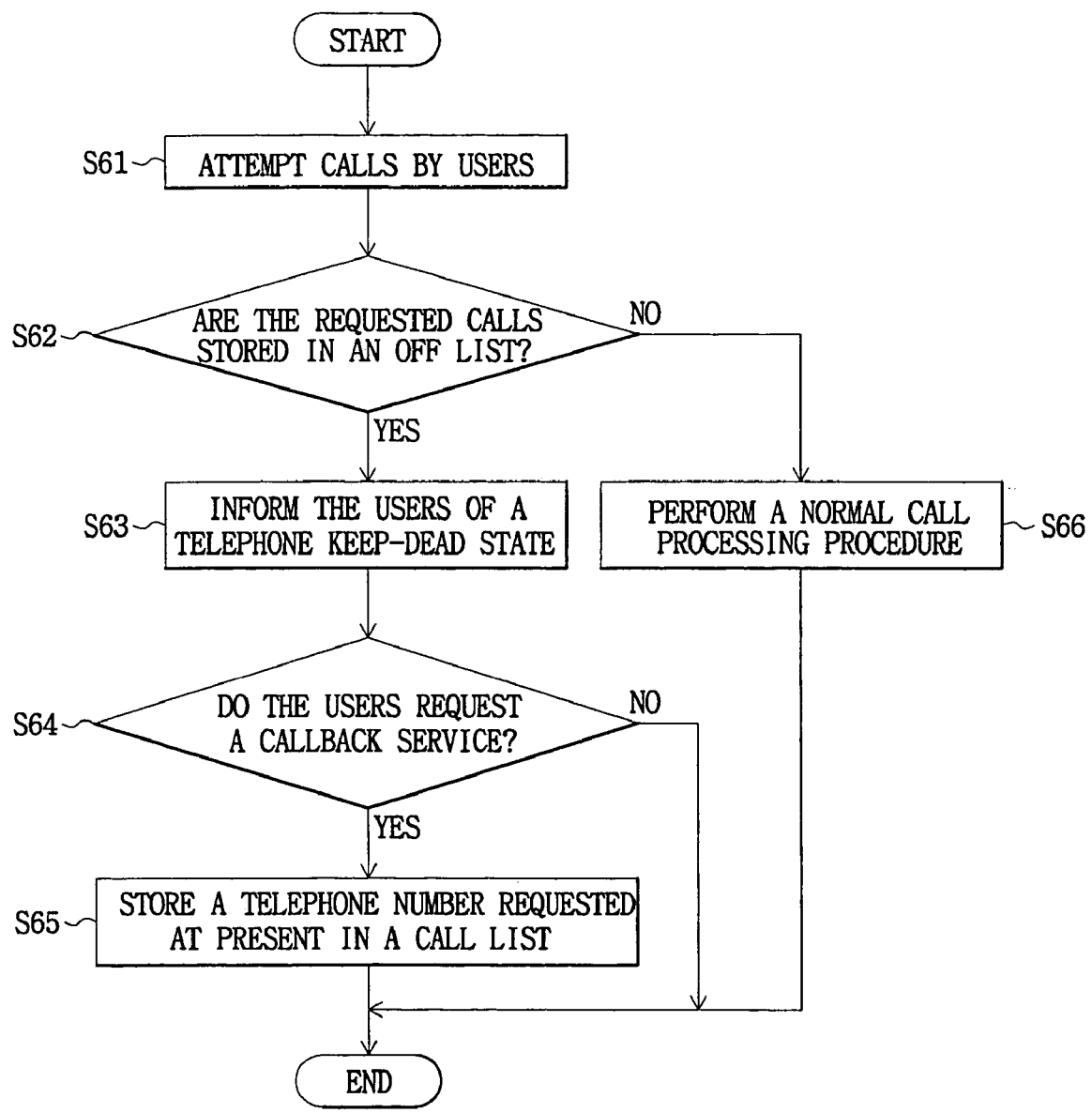
FIG. 6 is a flow chart illustrating a process of transmitting information on an off-terminal of other terminals to target terminals from an exchange according to one embodiment of the present invention.

FIG. 6 is a flow chart illustrating a process of transmitting information on an off-terminal of other terminals to target terminals from an exchange according to one embodiment of the present invention.

Hereinafter, among the above conceptual operation relations, a process of making calls by substantially attempting the calls by users will be described in reference to FIG. 6.

First, users attempt calls to target terminals by pressing telephone digits of the target terminals S61.

It is comparatively decided whether the telephone numbers of the target terminals for calls requested by a terminal are stored in an off list corresponding to a keep-dead state S62. If the telephone numbers of the target terminals are not stored in the off list, a normal call processing procedure is performed S66.

If the telephone numbers of the target terminals are decided to be stored in the off list in the step S62, the users are informed by the terminal displaying a keep-dead state to the users through a user interface 110 S63.

When the users recognize the keep-dead state, a menu screen for requesting a callback service is displayed so that the users can select whether to use the callback service S64.

If it is decided that the users request the callback service in the step 64, a telephone number of a present target terminal is stored in a call list 132 meaning a call request scheduled list S65.

While the users request the callback service like above, if a terminal is converted into a keep-alive state from a keep-dead state later, a transmission terminal automatically attempts a call to the target terminals.

Such process will be described as follows in reference to FIG. 7.

Figure 7:
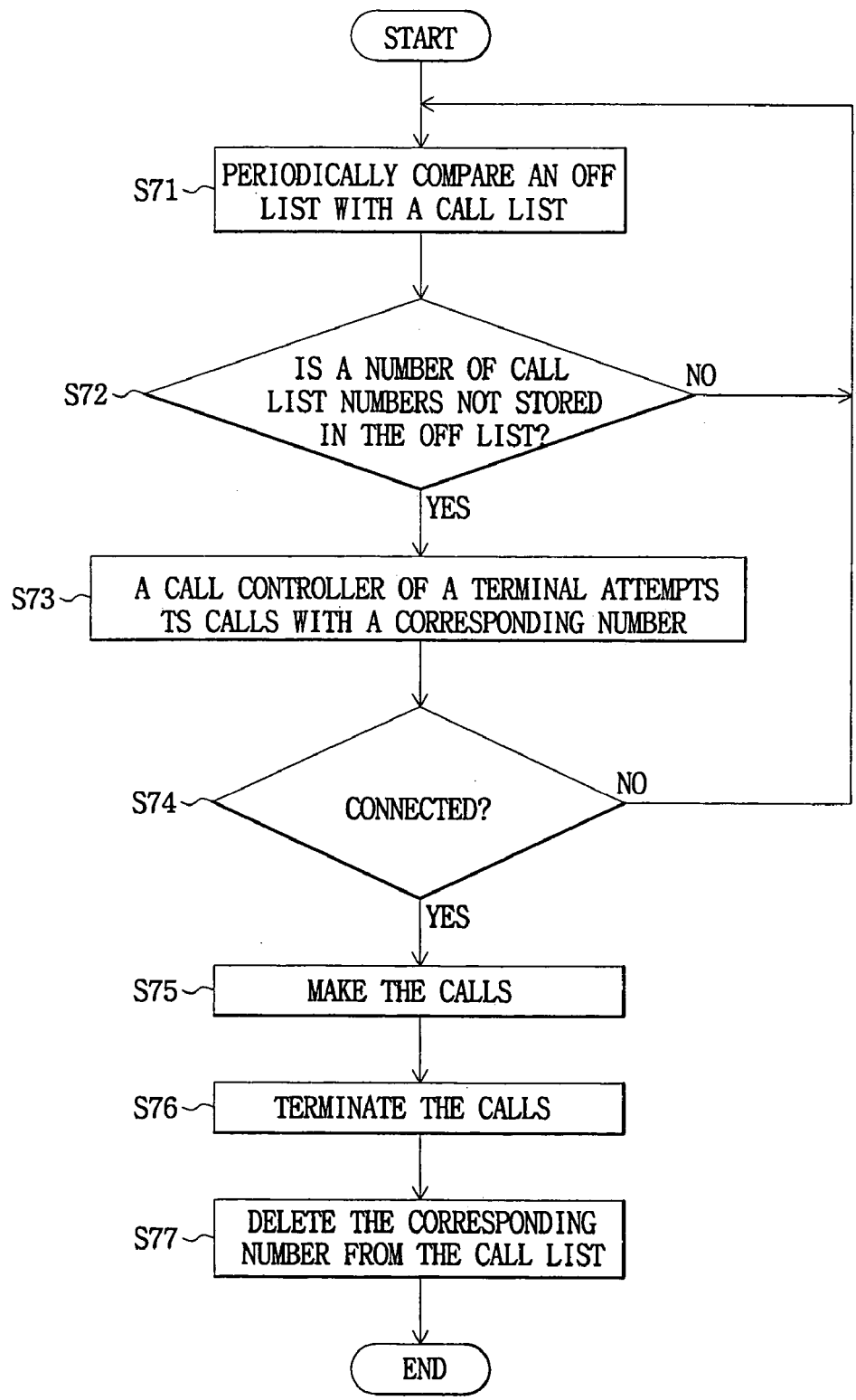
FIG. 7 is a flow chart illustrating a process of substantially using a callback function in a terminal according to one embodiment of the present invention.

FIG. 7 is a flow chart illustrating a process of substantially using a callback function in a terminal according to one embodiment of the present invention.

A terminal periodically compares an off list 131 with a call list S71, and comparatively decides whether a number of call list 132 numbers is not stored in the off list 131 S72.

For a call requesting the callback service, the step S72 is performed to know whether a number converted into a keep-alive state from a keep-dead state is generated.

If any changes do not occur in the off list numbers in the step S72, it means there is no number converted into the keep-alive state from the keep-dead state. Thus, it returns to the step S71 since it is unnecessary to use the callback service.

If it is decided that a number of the call list numbers is not stored in the off list, it means that there is a number converted into the keep-alive state from the keep-dead state. Thus, a call controller 120 of the terminal attempts a call to a corresponding target terminal in order to perform the callback service S73.

The terminal comparatively decides whether to be connected with the target terminal S74. If the terminal is connected with the target terminal, a user makes the call S75.

When the call is terminated after the user sufficiently speaks by telephone S76, the call is terminated by the callback service. Therefore, a system interface 130 of a terminal (Tn) deletes a telephone number of the target terminal to which the present call is made from a call request scheduled list (call list) S77.

If telephone calls applying the callback service are smoothly made in such a way, it is possible for users to automatically attempt the calls when target terminals are converted into a keep-alive state from a keep-dead state without attempting the calls to the keep-dead target terminal many times.

It is to be understood that changes and modifications to the embodiments described above will be apparent to those skilled in the art, and are contemplated. It is therefore intended that the foregoing detailed description be regarded as illustrative rather than limiting, and that it be understood that it is the following claims, including all equivalents, that are intended to define the spirit and scope of this invention.

As described so far, according to the present invention, it is possible to supply a callback service under a wireless LAN environment. Accordingly, user terminals themselves can attempt calls to target terminals converted into a keep-alive state without requiring another time for attempting the calls to the target terminals by manual operations. So, users do not have to waste time owing to call attempts without unnecessary manual operation, thereby increasing user convenience.

In addition, terminals themselves attempt calls by checking a state of target terminals. Thus, a system, that is, a wireless LAN exchange does not have any specific load.

What is claimed is:

1. A method of processing a call of a wireless local area network exchange using a callback function, comprising the steps of:

periodically transmitting a keep-alive signal to the wireless local area network exchange from terminals;

considering terminals from which the keep-alive signal is not transmitted as keep-dead terminals, and transmitting a telephone number list of the keep-dead terminals to each terminal by the wireless local area network exchange;

attempting calls to target terminals to be substantially called, and requesting a callback service according to user intentions when telephone numbers of the target terminals are stored in the telephone number list by the terminals; and automatically attempting the calls to the target terminals from the terminals when the target terminals are converted into a keep-alive state from a keep-dead state and the callback service is requested.

2. The method of claim 1, wherein the step of periodically transmitting the keep-alive signal comprises the steps of:

comparatively deciding whether a keep-alive transmission period has come by the terminals;

transmitting terminal state information to the wireless local area network exchange when the keep-alive period has come; and receiving the terminal state information from a plurality of terminals, and upgrading contents of a terminal state information storage by the wireless local area network exchange.

3. The method of claim 1, wherein the step of considering terminals from which the keep-alive signal is not transmitted as keep-dead terminals comprises the steps of:

comparatively deciding whether it is time for transmitting other terminal information to each terminal by the wireless local area network exchange;

considering terminals from which the keep-alive signal is not transmitted as keep-dead terminals among other terminal information, and transmitting telephone number list about the keep-dead terminals to other terminals; and receiving the telephone number list, and upgrading contents of the telephone number list by the terminals.

4. The method of claim 1, wherein the step of attempting calls to target terminals further comprises the steps of:

attempting calls to target terminals from the terminals when telephone number digits are dialed by users;

comparatively deciding whether telephone numbers of the target terminals for the calls requested by the terminals are stored in the telephone number list corresponding to a keep-dead state;

performing a normal call processing procedure when the telephone numbers of the target terminals are not stored in the off list;

informing the users of the keep-dead state when the telephone numbers of the target terminals are stored in the telephone number list;

comparatively deciding whether to use the callback service by the users recognizing the keep-dead state; and storing a telephone number of a present target terminal in a call list which is scheduled a call request when the users select the callback service.

5. The method of claim 1, wherein the step of automatically attempting the calls to the target terminals comprises the steps of:

periodically comparing the telephone number list, which is a keep-dead terminal list, with the call list, which is the call request scheduled list by the terminals, in order to use the callback service;

comparatively deciding whether a number of call list numbers is not stored in the telephone number list, in order to know a number converted into a keep-alive state from a keep-dead state for the calls requesting the callback service;

returning to a standby state as the callback service is unnecessary to where there is no change in the telephone number list by the number converted into the keep-alive state from the keep-dead state is not stored;

attempting the calls to the corresponding number from a call controller of the terminals in order to perform the callback service, since the number of the call list numbers is not stored in the off list, meaning there is a number converted into the keep-alive state from the keep-dead state;

comparatively deciding whether to be connected with the target terminals;

making the calls by the users when connected with the target terminals; and considering that the calls are terminated by the callback service when the users terminate the calls, and deleting the number of the target terminals to which a present call is made from the call request scheduled list.

6. The method of claim 1, with the target terminal being any one of a destination terminal and a receiving terminal.

7. The method of claim 1, with the call request scheduled list being a call list.

8. The method of claim 2, wherein the step of considering terminals from which the keep-alive signal is not transmitted as keep-dead terminals comprises the steps of:

comparatively deciding whether it is time for transmitting other terminal information to each terminal by the wireless local area network exchange;

considering terminals from which the keep-alive signal is not transmitted as keep-dead terminals among other terminal information, and transmitting telephone number list about the keep-dead terminals to other terminals; and receiving the telephone number list, and upgrading contents of the telephone number list by the terminals.

9. The method of claim 8, wherein the step of attempting calls to target terminals further comprises the steps of:

attempting calls to target terminals from the terminals when telephone number digits are performed by users;

comparatively deciding whether telephone numbers of the target terminals for the calls requested by the terminals are stored in the telephone number list corresponding to a keep-dead state;

performing a normal call processing procedure when the telephone numbers of the target terminals are not stored in the off list;

informing the users of the keep-dead state when the telephone numbers of the target terminals are stored in the telephone number list;

comparatively deciding whether to use the callback service by the users recognizing the keep-dead state; and storing a telephone number of a present target terminal in a call list which is scheduled a call request when the users select the callback service.

10. The method of claim 9, wherein the step of automatically attempting the calls to the target terminals comprises the steps of:

periodically comparing the telephone number list, which is a keep-dead terminal list, with the call list, which is the call request scheduled list by the terminals, in order to use the callback service;

comparatively deciding whether a number of call list numbers is not stored in the telephone number list, in order to know a number converted into a keep-alive state from a keep-dead state for the calls requesting the callback service;

returning to a standby state as the callback service is unnecessary to where there is no change in the telephone number list by the number converted into the keep-alive state from the keep-dead state is not stored;

attempting the calls to the corresponding number from a call controller of the terminals in order to perform the callback service, since the number of the call list numbers is not stored in the off list, meaning there is a number converted into the keep-alive state from the keep-dead state;

comparatively deciding whether to be connected with the target terminals;

making the calls by the users when connected with the target terminals; and considering that the calls are terminated by the callback service when the users terminate the calls, and deleting the number of the target terminals to which a present call is made from the call request scheduled list.

11. The method of claim 2, wherein the step of attempting calls to target terminals further comprises the steps of:

attempting calls to target terminals from the terminals when telephone number digits are performed by users;

comparatively deciding whether telephone numbers of the target terminals for the calls requested by the terminals are stored in the telephone number list corresponding to a keep-dead state;

performing a normal call processing procedure when the telephone numbers of the target terminals are not stored in the off list;

informing the users of the keep-dead state when the telephone numbers of the target terminals are stored in the telephone number list;

comparatively deciding whether to use the callback service by the users recognizing the keep-dead state; and storing a telephone number of a present target terminal in a call list which is scheduled a call request when the users select the callback service.

12. The method of claim 2, wherein the step of automatically attempting the calls to the target terminals comprises the steps of:

periodically comparing the telephone number list, which is a keep-dead terminal list, with the call list, which is the call request scheduled list by the terminals, in order to use the callback service;

comparatively deciding whether a number of call list numbers is not stored in the telephone number list, in order to know a number converted into a keep-alive state from a keep-dead state for the calls requesting the callback service;

returning to a standby state as the callback service is unnecessary to where there is no change in the telephone number list by the number converted into the keep-alive state from the keep-dead state is not stored;

attempting the calls to the corresponding number from a call controller of the terminals in order to perform the callback service, since the number of the call list numbers is not stored in the off list, meaning there is a number converted into the keep-alive state from the keep-dead state;

comparatively deciding whether to be connected with the target terminals;

making the calls by the users when connected with the target terminals; and considering that the calls are terminated by the callback service when the users terminate the calls, and deleting the number of the target terminals to which a present call is made from the call request scheduled list.

13. An apparatus for processing a call of a wireless local area network, comprising:

a terminal, comprising:
a user interface interfacing with a user to perform a corresponding command according to a selected operation of the user;
a call controller overall controlling calls;
a network interface interfacing to physically perform communication between the terminal and the wireless local area network exchange; and
a system interface interfacing with a wireless local area network exchange system and having data on an the telephone number list storing a list of keep-dead target terminals and data on a call list storing a call request scheduled list corresponding to telephone numbers to which a callback service is requested by the user among telephone numbers of the target terminals that fail to call attempts; and a wireless local area network exchange, comprising:
a call controller overall controlling the calls;
a terminal interface considering terminals from which a keep-alive signal is not transmitted as keep-dead terminals as interfacing with the terminal and storing the telephone number list about the keep-dead terminals in a terminal state information storage;
a network interface interfacing to physically perform communication between the terminal and the wireless local area network exchange; and
an access point connected to the network interface in a wire line to enable wireless communication between the wireless local area network exchange and the terminal and transceiving a wireless signal to the terminal.

14. An apparatus for processing a call of a wireless network, comprising:

a terminal, comprising:
a user interface interfacing with a user to perform a corresponding command according to a selected operation of the user;
a call controller controlling calls;
a network interface interfacing to physically perform communication between the terminal and the wireless network exchange; and
a system interface interfacing with a wireless local area network exchange system and having data on an address list storing a list of keep-dead target terminals and data on a call list storing a call request scheduled list corresponding to addresses to which a callback service is requested by the user among addresses of the target terminals that fail to call attempts; and a wireless network exchange, comprising:
a call controller controlling the calls;
a terminal interface considering terminals from which a keep-alive signal is not transmitted as keep-dead terminals as interfacing with the terminal and storing the address list about the keep-dead terminals in a terminal state information storage;

a network interface interfacing to physically perform communication between the terminal and the wireless network exchange; and an access point connected to the network interface in a wire line to enable wireless communication between the wireless network exchange and the terminal and transceiving a wireless signal to the terminal.

15. A method of processing a call, comprising:

periodically transmitting a keep-alive signal to a wireless network exchange from a plurality of terminals;

considering terminals from which the keep-alive signal is not transmitted as keep-dead terminals, and transmitting an address list of the keep-dead terminals to each terminal by the wireless network exchange;

attempting calls to target terminals to be substantially called, and requesting a callback service according to user intentions when addresses of the target terminals are stored in the address list by the terminals; and automatically attempting the calls to the target terminals from the terminals when the target terminals are converted into a keep-alive state from a keep-dead state and the callback service is requested.

16. The method of claim 15, wherein the periodically transmitting the keep-alive signal comprises:

comparatively deciding whether a keep-alive transmission period has come by the terminals; and transmitting terminal state information to the wireless network exchange when the keep-alive period has come.

17. The method of claim 16, wherein the periodically transmitting the keep-alive signal further comprises of receiving the terminal state information from a plurality of terminals, and upgrading contents of a terminal state information storage by the wireless network exchange.

18. The method of claim 16, wherein the considering terminals from which the keep-alive signal is not transmitted as keep-dead terminals comprises:

comparatively deciding whether to transmit other terminal information to each terminal by the wireless network exchange;

considering terminals from which the keep-alive signal is not transmitted as keep-dead terminals among other terminal information, and transmitting an address list about the keep-dead terminals to other terminals; and receiving the address list, and upgrading contents of the address list by the terminals.

19. The method of claim 18, wherein the attempting calls to target terminals further comprises:

attempting calls to target terminals from the terminals when address characters are performed;

comparatively deciding whether addresses of the target terminals for the calls requested by the terminals are stored in the address list corresponding to a keep-dead state;

performing a normal call processing procedure when the address of the target terminals are not stored in the off list;

informing the users of the keep-dead state when the addresses of the target terminals are stored in the address list;

deciding whether to use the callback service by the users recognizing the keep-dead state; and storing an address of a present target terminal in a call list which is scheduled a call request when the users select the callback service.

20. The method of claim 19, wherein the automatically attempting the calls to the target terminals comprises:

periodically comparing the address list, which is a keep-dead terminal list, with the call list, which is the call request scheduled list by the terminals, in order to use the callback service;

comparatively deciding whether a character of call list addresses is not stored in the address list, in order to know an address converted into a keep-alive state from a keep-dead state for the calls requesting the callback service;

returning to a standby state as the callback service is unnecessary from there being no change in the address list where the address converted into the keep-alive state from the keep-dead state is not stored;

attempting the calls to the corresponding address from a call controller of the terminals in order to perform the callback service, since the address of the call list addresses is not stored in the off list, meaning there is an address converted into the keep-alive state from the keep-dead state;

comparatively deciding whether to be connected with the target terminals;

making the calls by the users when connected with the target terminals; and considering that the calls are terminated by the callback service when the users terminate the calls, and deleting the address of the target terminals to which a present call is made from the call request scheduled list.

* * * * *